Figure 1:
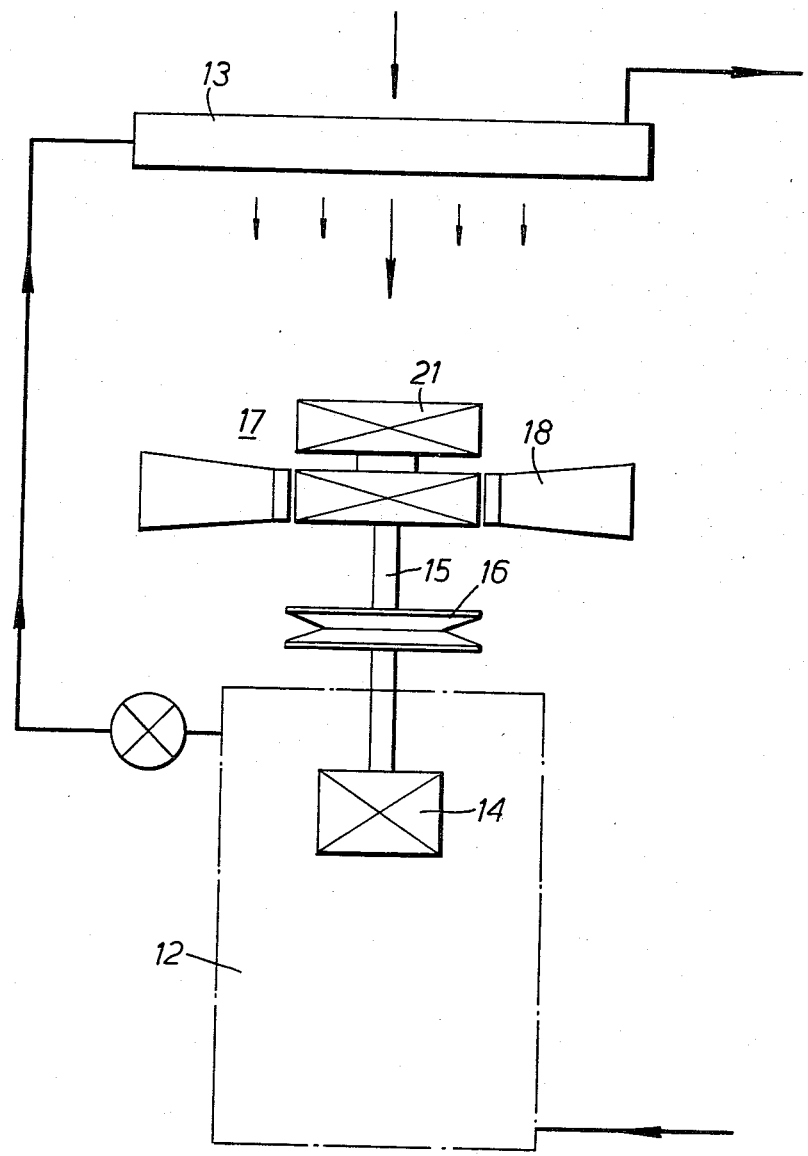

United States Patent [19]

Hart et al.

[11] 4,290,393

[45] Sep. 22, 1981

[54] FAN UNIT

[76] Inventors: William B. Hart, 1 Almondhayes, Ipswich, Suffolk; Rami Domloge, 12 Wilmslow Dr., Ipswich IP2 OXX, Suffolk, both of England

[21] Appl. No.: 955,200

[22] Filed: Oct. 27, 1978

[51] Int. Cl.³ ............................................... F01P 7/02
[52] U.S. Cl. ............................... 123/41.12; 123/41.11
[58] Field of Search ........................ 123/41.12, 41.11; 236/35; 192/82 T

[56] References Cited

U.S. PATENT DOCUMENTS 2,740,388  4/1956  Bennorth .......................... 123/41.12
4,081,066  3/1978  Ryba ................................ 123/41.12

Primary Examiner—Ronald H. Lazarus
Attorney, Agent, or Firm—Bernard, Rothwell & Brown

[57] ABSTRACT

A thermostatically controlled fan unit, particularly for a motor vehicle, has a fan assembly driven through a clutch. The clutch is controlled by a clutch actuator incorporating an element having an elastic modulus which varies significantly with temperature.

11 Claims, 4 Drawing Figures

FAN UNIT

This invention relates to a fan unit for inducing a flow of air, particularly in a motor vehicle. When the invention is applied to the cooling of a water-cooled vehicle engine, the induced flow of air may pass through the water-cooling radiator, while, when it is applied to an air-cooled engine, the flow of air may be about the engine itself.

The common expedient of having the fan unit of a motor vehicle continuously coupled to the vehicle engine is energy-consuming; the action of the fan is not needed for much of the time, for example when the vehicle is travelling at moderate speed and a fast flow of air through the radiator is naturally induced. Accordingly, a number of mechanisms for driving the fan unit only when needed for cooling the engine have been adopted, the most popular using an electric motor which drives the fan and which is controlled by a temperature-responsive element subject to the temperature of the engine cooling water. Such a mechanism has not always been satisfactory from the point of view of cost or reliability and may also lack the power to cope with some extreme cooling situations.

It has previously been proposed to drive the fan unit of a motor vehicle from a driven part of the engine, such as the water pump shaft, through a torque-converter, having a valve which controls the slippage between driving and driven parts and which is in turn controlled thermostatically by a bi-metallic element; see for example U.K. Patent Specification No. 1029364. Apart from being unduly complicated, and expensive, such a mechanism has the disadvantage that the range of fan speed modulation with temperature is rather limited because of the inability of such a mechanism either to disengage or to engage the fan fully. Another disadvantage of this mechanism is the need to provide effective sealing between the moving bi-metallic-actuated valve and the cavities containing the viscous medium.

The main difficulty in using a bi-metallic element to operate directly a clutch between the engine and the fan unit, is that such an element has not sufficient power for the function. A wax-containing capsule for the same purpose is capable of performing the clutching action, but it is not easy to arrange a modulating clutch action and the sealing problem becomes significant.

In the present invention, a clutch is employed between a fan and a driving member and the clutch is actuated by a mechanism which includes an element of shape memory effect material having a variable elastic modulus which varies significantly with temperature over a transition temperature range and in a reversible manner. There are a number of known alloys which display the shape memory effect when subject to a preconditioning heat treatment; nickel-titanium alloys are particularly well known. A preferred alloy to be used in this invention is a copper-zinc-aluminium alloy.

An element of shape memory effect material is capable of performing the two functions of sensing temperature and of exerting a thrust capable of operating a clutch. In addition, the actuating mechanism supplies an actuating movement, the magnitude of which is dependent on the change of temperature. Thus, the actuating mechanism is capable of varying the degree by which the clutch is closed and to cause the fan to be driven at varying speeds between zero, or a small value, through intermediate speeds, to a fully clutched speed, according to the temperature detected. Such variation of speed with temperature is difficult to achieve with other forms of thermostatic actuator.

In a preferred form of the invention, a thermally controlled fan unit comprises a rotatable fan; a driving member; engageable driven and driving clutch plates operatively connected to the fan and to the driving member respectively; and a temperature responsive clutch actuating mechanism acting on one of the clutch plates, that mechanism including an element of shape memory effect material, having a variable elastic modulus which varies significantly with temperature over a transition temperature range, and biasing means acting in opposition to the element.

The element of shape memory effect material, when the invention is applied to a water-cooled internal combustion engine, may be located behind the air-cooled radiator, in order to detect the temperature of the air that has passed through the radiator, or may be located within the cooling water itself.

Figure 2:
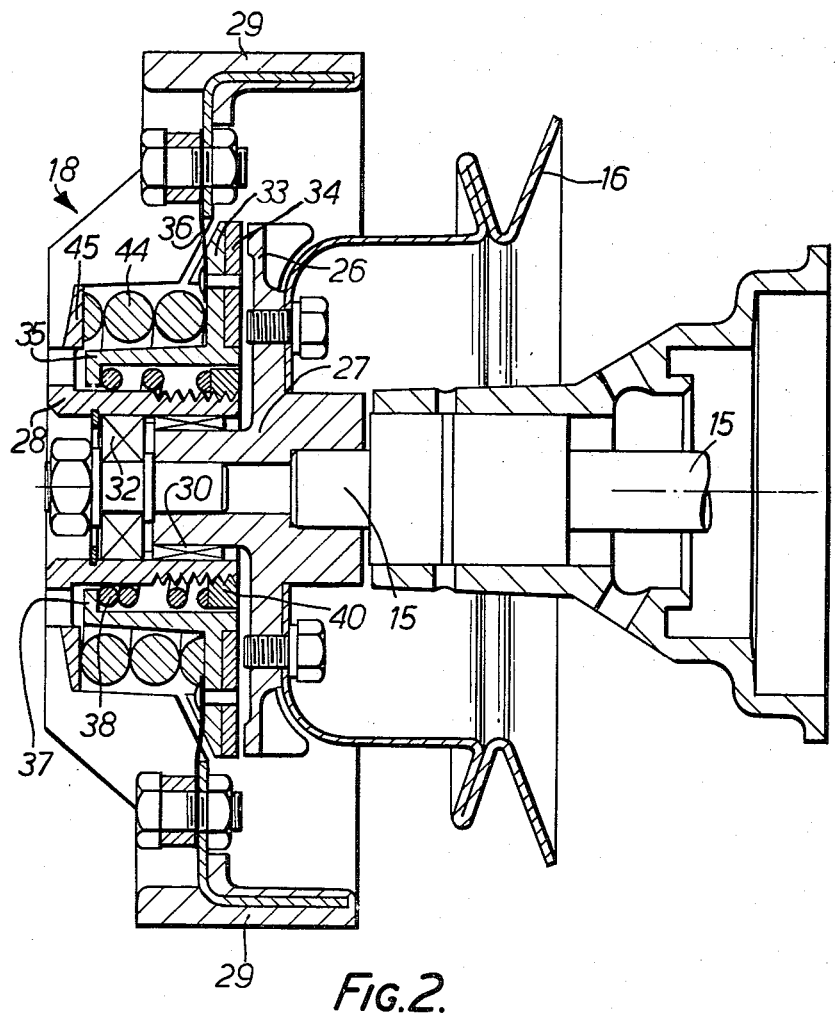
Figure 3:
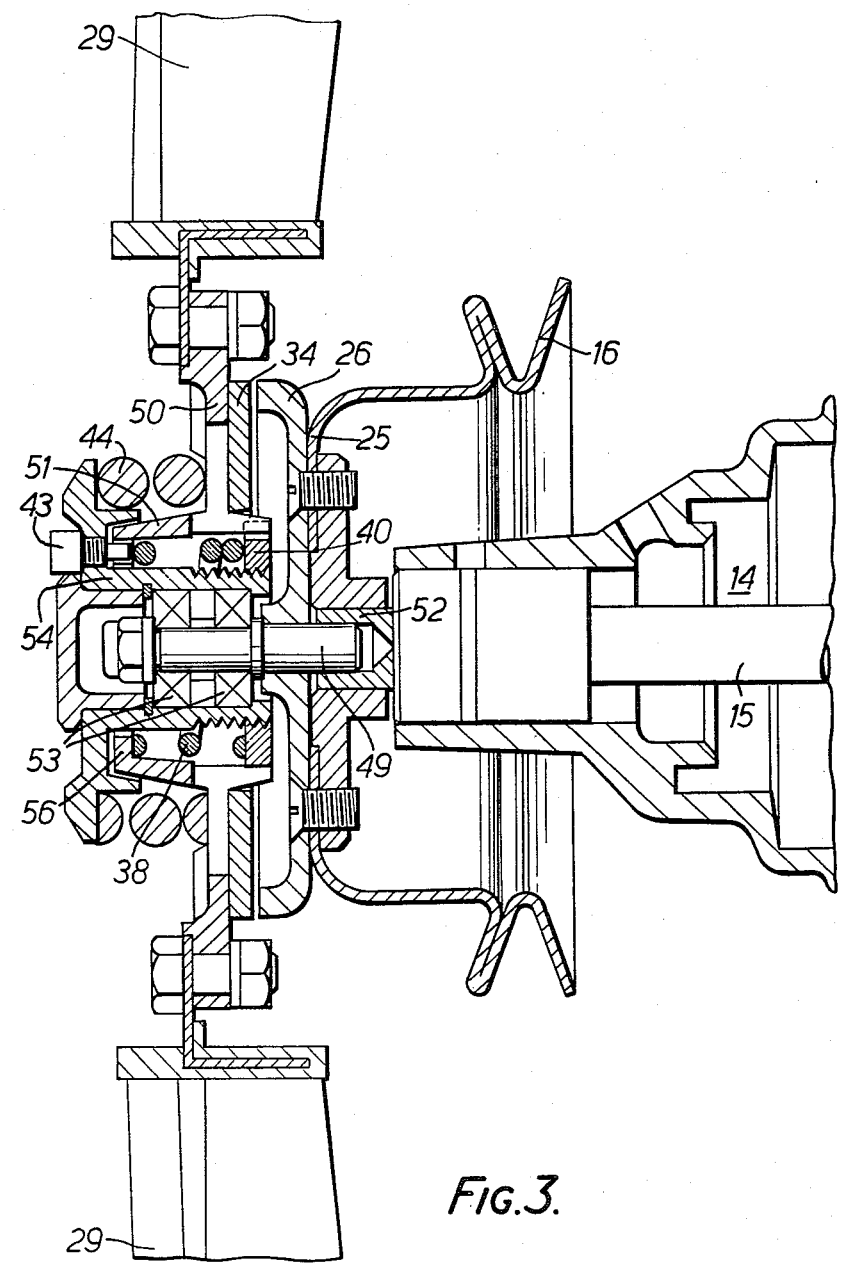
Figure 4:
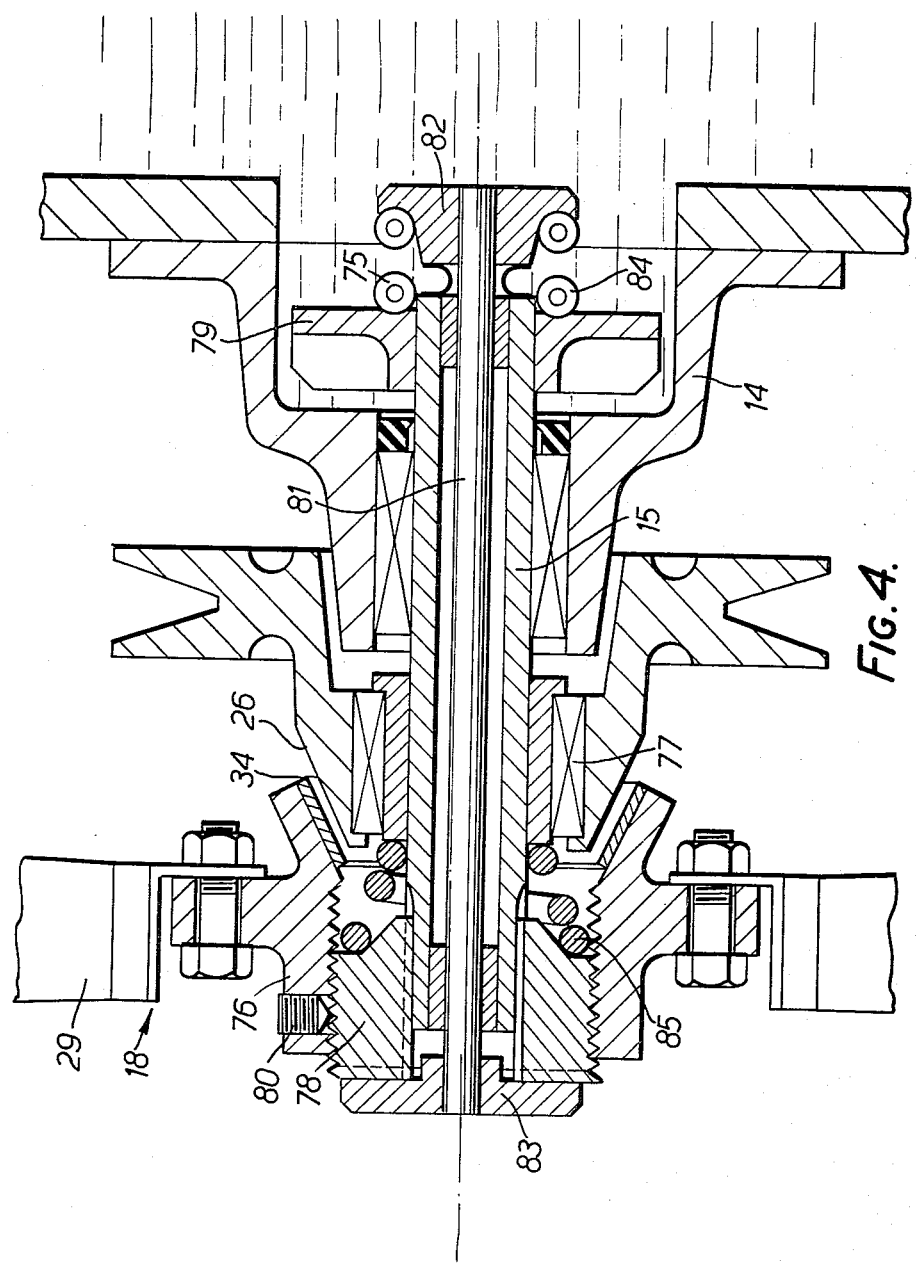

The invention will be more readily understood by way of example from the following description of thermally controlled fan units in accordance therewith, reference being made to the accompanying drawings, in which FIG. 1 illustrates a fan unit located in the air flow through the radiator of a vehicle engine, FIG. 2 is an axial section through the fan unit of FIG. 1, FIG. 3 is a similar section through an alternative form of fan unit and, FIG. 4 is an axial section through a fan unit having the temperature sensitive element located in the cooling water of a water-cooled engine.

In FIG. 1, a water cooled engine is indicated at 12 and its radiator at 13. Circulation of water between the engine block and the radiator is ensured by a water pump 14 having a pump shaft 15 driven, as usual, from the engine by a fan belt and a fan pulley 16. In the arrangement illustrated, a fan unit 17 is located beyond the radiator 13 i.e. it is arranged to suck air through the radiator, rather than blow it through the radiator. The fan unit comprises a freely mounted fan 18 which can be connected to the pulley 16 by means of a transmission unit 21, when operated by a temperature-sensitive actuating mechanism 21. As will be described in detail hereafter, the actuating mechanism 21 includes a sensor of shape memory effect material of which the elastic modulus varies significantly with temperature. The sensor is subject to the warm air passing from the radiator 13 and the radiant heat from that radiator. The actuating mechanism 21 is so arranged that, normally, the transmission 21 disengages, or largely disengages, the fan 18 from the pulley 16, but, when the temperature of the radiator 13 rises sufficiently, it operates the transmission 21 to engage fully the device.

In FIG. 2, the water pump 14 and its shaft 15 are shown in greater detail than in FIG. 1. The pulley 16 is shown as part of a sheet metal pressing which includes an end plate 15 bolted to a drive flange 16 of the clutch 20 (FIG. 1). Flange 16 includes an integral sleeve 27, which is keyed on the shaft 15, so that the rotation of pulley 16 is transferred to the water pump shaft. Forward of the flange 26, which forms the driving plate of the clutch is the fan 18 comprising a bush 28 carrying the impeller blades 29. Bush 28 is carried partly on sleeve 27 through bearing 30 and partly on a stub shaft 31 through bearing 32.

The driven clutch plate consists of disc 33 carrying a clutch lining 34 located opposite to and normally spaced from the flange 26. Disc 33 is integral with a sleeve 35 located coaxially about the bush 28 and the disc 33 is connected to the fan assembly 18 by a flexible metal diaphragm 36, which allows the sleeve 35 to move axially relative to the bush 28 but transmits rotation of the disc 33 to the fan 18. The sleeve 35 has at its end distant from the flange 26 an inwardly directed lip 37. A helical steel biasing spring 38 is located about the bush 28 and is disposed between the lip 37 and a temperature calibrating ring 40 which is threaded on a threaded cylindrical part of bush 28. Adjustment of the ring 40 in the axial direction is achieved by rotation on the bush 28. The spring 38 acts to bias disc 33 away from flange 26, i.e. in a direction to disengage the clutch.

A helical compression spring 44 made of shape memory effect material is located externally of the sleeve 35 and acts between the disc 33 and an annular rib 45 forming part of the structure of the fan 18. The shape memory effect material of the spring 44 has a variable elastic modulus which varies significantly in a reversible manner with temperature over a transition temperature range. The material is a heat-treated alloy which exhibits a variable elastic modulus over the transition temperature range which is determined by the alloy composition and which is chosen to encompass the desired working temperature range over which the clutch is to operate. A preferred alloy is a copper-zinc-aluminium alloy having the following composition by weight:

Copper: 70%
Aluminium: 4%
Zinc: 26%

For a limited range of temperature above and below the transition temperature range, change of temperature has no appreciable affect on the thermal properties of the spring 44. In the transition range, increase in temperature results in progressive increase in the elastic modulus. As will be observed, biasing spring 38 acts on the disc 33 in opposition to the shape memory effect spring 44 which is therefore stressed. Increase in temperature thus results in progressive decrease in the strain of the spring 44 and hence the movement of the disc 33 towards the clutch-engaging condition. The action of the shape memory effect spring 44 is reversible; on fall of temperature, the disc is caused to move away from the flange 26 to open the clutch.

The engagement of the clutch is progressive. When the driven clutch plate 33, 34 is in the position shown, the only drive to the fan is through the friction inherent in the bearings 32, 30. This results in a low idling speed of the fan, maintaining sufficient flow of hot air from the radiator to give a signal, through convected heat, to the temperature-responsive spring 44. As the temperature to which the spring 44 is subject increases, the clutch lining 34 is brought into slipping engagement with the flange 26, causing progressive speeding up of the impeller blades 29. As the temperature rises, the transmission ratio of the clutch increases until, at extreme temperature conditions, the clutch becomes fully engaged, if the input speed to the fan belt pulley 16 is sufficiently low.

If the idling speed of the fan is insufficient to cause the temperature-responsive spring 44 to operate properly, the flow of air from the radiator to the spring 44 is increased in order to cause that spring to respond to rise in the cooling water temperature, by causing the fan 18 to turn at an idle speed that is a little higher than that given by normal low friction bearings.

Adjustment of ring 40 axially along bush 28 changes the bias applied by spring 37 to the shape memory effect spring 44 and enables the temperature at which the clutch is first engaged to be altered.

In the modified construction of FIG. 3, parts corresponding to those of FIG. 2 are given corresponding reference numerals. The FIG. 3 construction differs primarily from the FIG. 2 construction in the fact that the driven clutch plate is carried by the fan assembly, which accordingly moves axially as the clutch is engaged and disengaged.

In FIG. 3 the impeller blades 30 are carried on a web 50, to which is secured the clutch lining 34, and which is integral with a bush 51. The pump shaft 15 terminates in a stub 52 in which is secured a journal 49. Mounted on that journal through bearings 53 is a sleeve 54 forming part of a bearing housing. The bias spring 38 acts between the calibration ring 40 and an inwardly directed lip 56 of the bush 51, and accordingly urges the fan assembly and the friction plate 34 away from the flange 26. Similarly, the shape memory effect spring 44 acts between the bearing housing 54 and the web 50 of the fan assembly. Transmission of the drive from the clutch plate 34 to the sleeve 54 is through the bush 51 and by a number of bolts, one of which is shown at 43, and which are held by the sleeve 54 and enter holes in the lip 56. The bolts 43, while transmitting the rotary motion, allow the bush 51 to move axially relative to the sleeve 54.

The operation of the fan unit of FIG. 3 is generally similar to that as described in relation to FIG. 2, except in that engagement and disengagement of the clutch is accompanied by axial movement of the fan assembly.

In FIG. 4, the shape memory effect element is located in a part of the cooling water circulating system. That element is shown in the form of a helical compression spring 75 disposed in the cooling water within the housing of the water pump 14. The shape memory effect spring 75 controls the movement of a ring 76 carrying the fan blade assembly 18 which carries the driven clutch plate 34, so that the drive to the fan assembly 18 is engaged and disengaged according to the water temperature.

More particularly, the water pump shaft 15 is hollow, being supported in bearings in the housing of the pump and carrying the pump impeller 79. The pulley 16 is rotatably mounted on shaft 15 by means of bearings 77, the driving clutch plate 26 being formed on a chamfered face of the pulley. An externally threaded sleevd 78 is splined to the end of shaft 15 and supports the ring 76 which is threaded on to the sleeve and retained in position by grub screw 80. An actuating rod 81 can slide within the pump shaft 15 and carries at its ends caps 82 and 83; cap 82 is located within the pump housing 14, is connected to the shaft 15 by a flexible seal 84 and is engaged by the shape memory effect spring 75 which also abuts the end of shaft 15. The other cap 83 engages the sleeve 78 which is biased to the left by compression spring 85. Springs 75 and 85 are thus opposed, spring 75 urging the ring 76 to the right and in the direction to cause engagement of the clutch. At low water temperatures, the stiffness of the shape memory effect spring 75 is low and the ring 76 is in the position shown in which the clutch is disengaged and there is no drive from the pulley 16 to either the fan blade assembly 18 or the water pump impeller 79. As the water temperature rises through the transition temperature range of the material of spring 75, the stiffness of that spring increases, the rod 81 is urged to the right and the clutch is engaged to cause rotation of ring 76 and, by virtue of the splined coupling between sleeve 78 and pump shaft 15, of the water impeller.

The temperature at which the clutch is engaged is selected by releasing the grub screw 80 and adjusting the axial position of ring 76 on sleeve 78. If, for example, ring 76 is moved closer to pulley 16, the travel of sleeve 78 to effect clutch engagement is smaller and the clutch is engaged at a lower temperature. Temperature selection is thus performed by varying the datum of the actuating mechanism, but it is possible by appropriate modification of the mechanical construction to select a temperature of actuation by varying the preload applied by the biasing spring, in the manner of FIGS. 2 and 3.

As the clutch in the FIG. 4 arrangement is controlled by water temperature, it is not necessary to have the fan assembly 18 arranged to be driven at a slow speed in the cold condition. However, if the water pump is such that circulation is impeded by the water impeller when stationary, the slow speed drive may be required.

Various modifications are of course possible. Thus, the shape memory effect element controlling engagement and disengagement of the clutch may take a form other than the helical spring arrangement shown in FIGS. 2 to 4. For example, it may take the form of one or more Belville washers. The adjustment of operating temperature in the constructions of FIGS. 2 and 3 may be performed by variation of the datum of the clutch actuating mechanism, in the manner of FIG. 4. Slow speed drive of the fan assembly 18 in the cold condition may be effected by having slipping engagement of the clutch, when the shape memory effect element is in its cold state. Lastly, the temperature-responsive clutch actuating mechanism (the spring 44 biased by the spring 38 in FIGS. 2 and 3) is not necessarily carried by the fan assembly 18. FIG. 4 shows the temperature-responsive spring physically located in the cooling water of the engine, but equally it may be located wherever it is able to sense the engine temperature, being then connected to the clutch through a remote control link, such as a Bowden cable. Thus the temperature-responsive element—the spring 44—may be located on the radiator so as to respond to the temperature of the cooling water and operate the clutch through a Bowden cable and thrust plate.

We claim:

1. A thermally controlled fan unit comprising a rotatable fan; a driving member; engageable driven and driving clutch plates operatively connected to the fan and to the driving member respectively; and a temperature responsive clutch actuating mechanism acting on one of the clutch plates, said mechanism including an element of shape memory effect material, having a variable elastic modulus which varies significantly with temperature over a transition temperature range, and second biasing means acting in opposition to the element; said shape memory effect material having sufficient energy to maintain engagement of said clutch plates; and adjustment means for adjusting said second biasing means acting in opposition to said element of shape memory effect material to adjust the temperature at which the clutch plates are engaged.

2. A thermally controlled fan unit according to claim 1, in which the fan is mounted for rotation about a predetermined axis and the clutch plate acted on by the actuating mechanism is movable axially relative to the fan but is held against rotation movement relative to the fan.

3. A thermally controlled fan unit according to claim 2, in which the clutch plate is secured to a sleeve secured to the fan through a flexible diaphragm.

4. A thermally controlled fan unit according to claim 3, in which the second biasing means is a helical spring arranged about the axis and acting between the sleeve and an abutment on the fan.

5. A thermally controlled fan unit according to claim 4, in which the abutment is axially adjustable relative to the fan to vary the bias applied by the shape memory effect element and hence the temperature of actuation.

6. A fan unit for an engine comprising a pulley adapted to be driven by the engine about an axis; a driving clutch plate secured to the pulley for rotation therewith; a fan journalled on bearings on a shaft mounted coaxially with the pulley; a driven clutch plate drivingly connected to the fan; and a temperature-responsive clutch actuating mechanism which includes a spring of shape memory effect alloy acting on the driven clutch plate urging that plate towards engagement with the driving clutch plate, the spring having an elastic modulus which varies significantly with temperature over a transition temperature range encompassing the required operating range of the fan, said spring providing substantially the whole of mechanical energy to maintain the clutch plates in engagement resilient biasing means opposing the action of the shape memory effect spring; and adjustment means for adjusting said resilient biasing means opposing the action of the shape memory effect spring to adjust the temperature at which the clutch plates are engaged.

7. A thermally controlled fan unit according to claim 6, in which the biasing means is a helical spring not made of a shape memory effect material.

8. A thermally controlled fan unit according to any one of claims 6 or 7, in which the engine is water cooled and has an air-cooled radiator for the water and the fan and the actuating mechanism are disposed behind the radiator in the direction of air flow.

9. A thermally controlled fan unit according to any one of claims 6 or 7, in which the engine is water-cooled and the shape memory effect spring is disposed within a passage in the engine for cooling water.

10. A thermally controlled fan unit according to any one of claims 6 or 7, in which the fan is so mounted that, when the clutch plates are disengaged, the fan is driven at a limited speed.

11. A thermally controlled fan unit according to claim 10, in which the shaft on which the fan is mounted is arranged to rotate with the driving clutch plate, and is carried on bearings with limited friction.

* * * * *

UNITED STATES PATENT AND TRADEMARK OFFICE
CERTIFICATE OF CORRECTION

PATENT NO. : 4,290,393

DATED : September 22, 1981

INVENTOR(S) : Hart et al.

It is certified that error appears in the above—identified patent and that said Letters Patent are hereby corrected as shown below:

Column 2, line 45, the number "21" should be --20--;
line 55, the number "21" should be --20--.

Signed and Sealed this

Twenty-third Day of March 1982

|SEAL|

Attest:

GERALD J. MOSSINGHOFF

Attesting Officer

Commissioner of Patents and Trademarks